Inventor
William D. Chaplin,
By [signature]
Attorney

Patented June 9, 1953

2,641,481

UNITED STATES PATENT OFFICE 2,641,481

BOGIE BEAM CONSTRUCTION

William D. Chaplin, Dereham, England, assignor to Cranes (Dereham) Limited, Dereham, Norfolk, England Application February 21, 1950, Serial No. 145,510
In Great Britain March 17, 1949

2 Claims. (Cl. 280—104.5)

1

This invention relates to road vehicles and is directed towards the provision of an improved axle mounting for heavy duty bogies for four wheels.

It is necessary that each axle can oscillate to ground contour and that the axle complete with its tyres must be easily removable.

On previous vehicles trouble has been experienced because the bearings at the centre of each axle are subjected to a very great deal of stress both from the undulation of the ground over which the vehicle is passing and from the steering action transmitted through the axles.

In the construction of the present invention frictionless bearings are used in a hollow bogie beam and placed well apart so that the stresses previously mentioned can be very well resisted.

In the preferred form a large bearing is used on the outer end where the radial load is greatest and this bearing also has to take thrust in both directions due to braking, wheel impact and the like.

On the accompanying drawings which illustrate one construction according to the invention:

Figure 1:
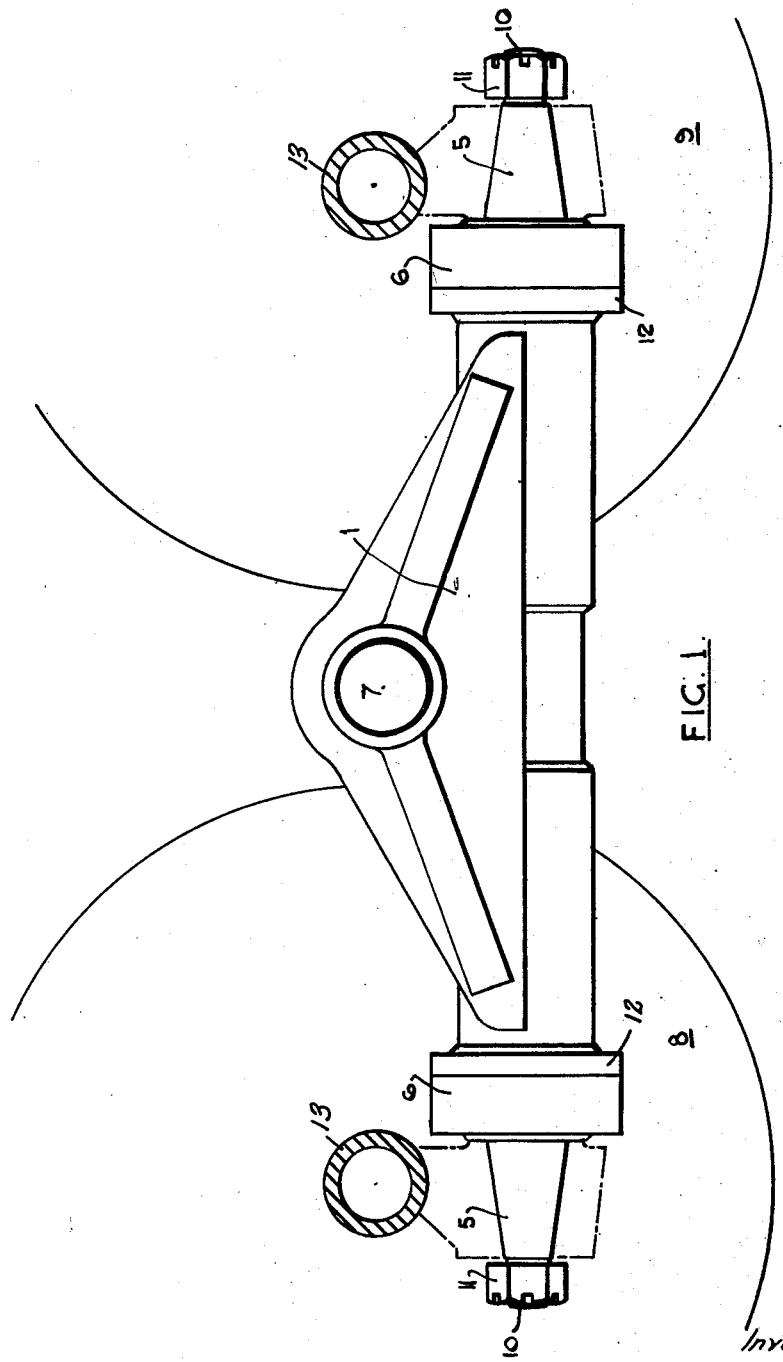
Fig. 1 shows a bogie beam in elevation.
Figure 2:
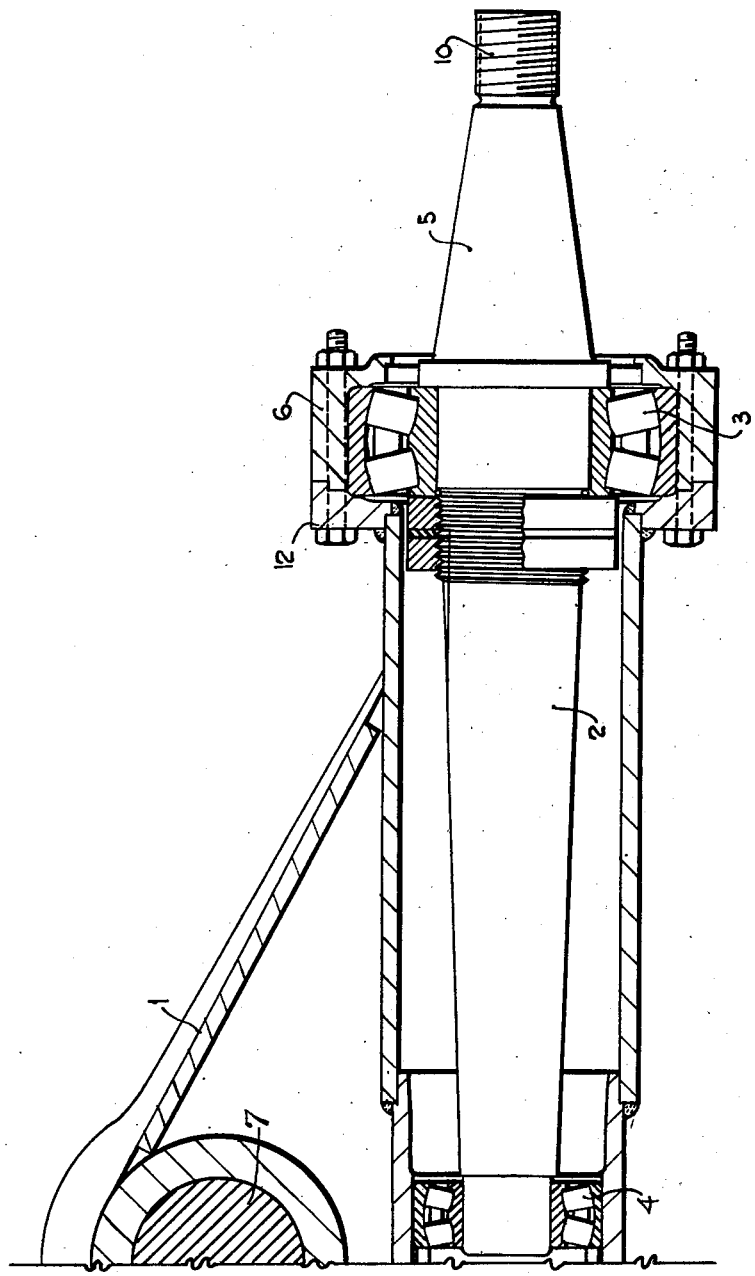
Fig. 2 shows a sectional view of one half of the beam to enlarged scale.

Referring to these drawings, the bogie beam 1 is hollow and carries two shafts 2 each running in roller bearings 3, 4 and having a tapered projecting trunnion 5. The extreme ends 10 of the shafts are cylindrical and threaded to receive castellated nuts 11.

The bearings 3 are surrounded by a two-part casing 6, 12 which excludes dust. The part 12 is secured to the end of the hollow beam 1 and the part 6 is bolted thereto.

The bogie beam is mounted on a shaft 7 on which it pivots. Pairs of wheels 8, 9 are carried at each end of the bogie beam.

Figure 3:
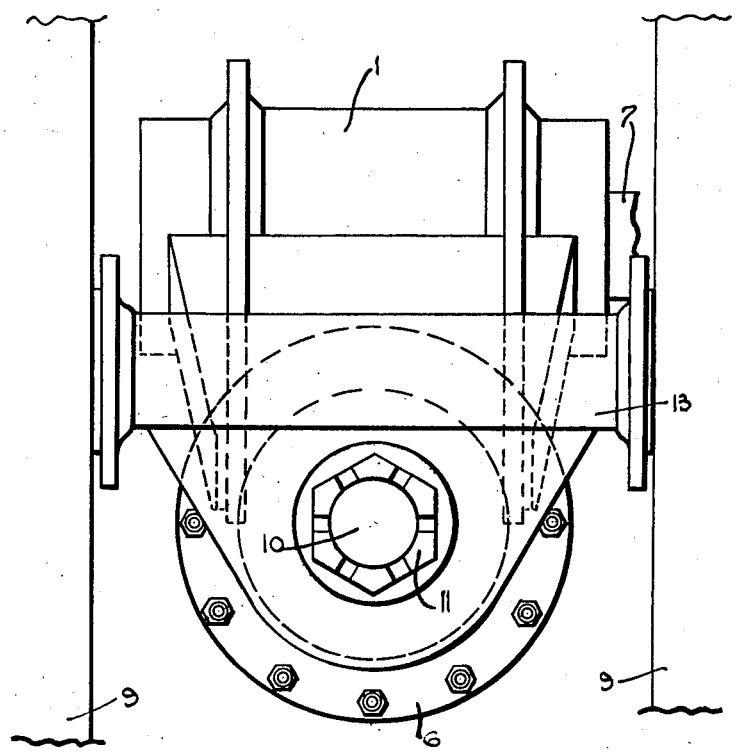
Fig. 3 shows an end view.

On the trunnions 5 there are fixed by the castellated nuts 11 bearing members in which are mounted the axles 13 (Fig. 3) connecting the pairs of wheels 8, 9. The beam 1 is suspended by said bearing members from said wheel axles 13 with its longitudinal axis below the axes of the wheel axles, as best shown in Figure 1.

I claim:

1. An axle mounting for heavy duty bogies

2 for wheel axles of road vehicles, comprising, in combination, a hollow bogie beam with its longitudinal axis below the axes of the wheel axles and having a central pivotal mounting, an antifriction bearing with axis parallel to said bogie beam axis and mounted in each end of said beam, two anti-friction bearings mounted centrally within said beam and in axial aligment with said end bearings respectively, two shafts in said beam each mounted in one of said end and central bearings respectively and extending substantially half the length of said beam, a trunnion carried by each shaft and extending beyond the respective end of the beam and end bearing, and means for securing on said trunnions the supporting axle connecting a pair of wheels.

2. An axle mounting for heavy duty bogies for wheel axles of road vehicles, comprising, in combination, a hollow bogie beam with its longitudinal axis below the axis of the wheel axles and having a central pivotal mounting, an anti-friction bearing with axis parallel to said bogie beam axis and mounted at each end of said beam, two anti-friction bearings mounted centrally within said beam and in axial alignment with said end bearings respectively, two shafts in said beam each mounted in one of said end and central bearings respectively, a trunnion carried by each shaft and extending beyond the respective end of the beam and end bearing, end retainer caps respectively surrounding said trunnions and removably mounted on the ends of said beam and enclosing said end bearings, and means for securing on said trunnions the supporting axle connecting a pair of wheels.

WILLIAM D. CHAPLIN.

References Cited in the file of this patent

UNITED STATES PATENTS

| Number | Name | Date |
|---|---|---|
| 2,121,862 | Dodge | June 28, 1938 |
| 2,311,252 | Reid | Feb. 16, 1943 |
| 2,442,354 | Gordon, Jr., et al. | June 1, 1948 |
| 2,446,205 | Wickersham et al. | Aug. 3, 1948 |

FOREIGN PATENTS

| Number | Country | Date |
|---|---|---|
| 720,976 | France | Feb. 26, 1932 |